United States Patent [19]
Link

[11] Patent Number: 5,768,757
[45] Date of Patent: Jun. 23, 1998

[54] TOOL TURRET FOR MACHINE TOOLS

[75] Inventor: Helmut Friedrich Link, Aichwald, Germany

[73] Assignee: Index-Werke GmbH & Co. KG Hahn & Tessky, Esslingen, Germany

[21] Appl. No.: 804,058

[22] Filed: Feb. 21, 1997

Related U.S. Application Data

[63] Continuation of Ser. No. 653,869, filed as PCT/EP94/02912 Sep. 2, 1994, abandoned.

[30]       Foreign Application Priority Data

Nov. 27, 1993  [DE]  Germany ........................ 43 40 512.6

[51] Int. Cl.⁶ ............................ B23B 3/16; F16H 55/00
[52] U.S. Cl. ........................ 29/48.5 R; 74/820; 82/159
[58] Field of Search ................................. 29/38, 39, 35.5, 29/48.5 A, 48.5 R; 82/159; 74/820, 813 L, 436

[56]               References Cited

U.S. PATENT DOCUMENTS

| | | | |
|---|---|---|---|
| 2,021,030 | 11/1935 | Swahnberg | 74/820 |
| 3,443,455 | 5/1969 | Zugel | 74/820 |
| 3,485,965 | 12/1969 | Bleibtrev et al. | 74/820 X |
| 3,546,958 | 12/1970 | Parks | 74/436 |
| 3,827,312 | 8/1974 | Bristol et al. | 74/436 |
| 3,835,723 | 9/1974 | Zugel | 74/820 X |
| 4,095,489 | 6/1978 | Hasegawa | 29/48.5 A X |
| 4,317,385 | 3/1982 | Harvey et al. | 74/820 X |
| 4,550,631 | 11/1985 | Yamazaki et al. | 29/48.5 R X |
| 4,563,910 | 1/1986 | Miyazaki | 74/820 |
| 5,123,149 | 6/1992 | Togawa et al. | 29/48.5 R |

FOREIGN PATENT DOCUMENTS

| | | |
|---|---|---|
| 0 202 528 | 11/1986 | European Pat. Off. . |
| 2 578 460 | 9/1986 | France . |
| 1650811 | 1/1970 | Germany ................... 74/820 |
| 1456670 | 2/1989 | U.S.S.R. ...................... 74/820 |
| 2 105 225 | 3/1988 | United Kingdom . |

*Primary Examiner*—William R. Briggs
*Attorney, Agent, or Firm*—Edward J. Timmer

[57]               ABSTRACT

Tool turret device for machine tools, comprising a turret head bearing device, to which a turret head is attached for rotation about an indexing axis, a turret head indexing device as well as locking means for the turret head, the turret head indexing device having an indexing disk similar to a Maltese cross, which is rotatable about the indexing axis together with the turret head and has a slot open at its circumference for each tool station of the turret head, and a rotarily drivable driver with a driver finger for insertion into the indexing disk slots, wherein for shortening the indexing times and saving on separate locking means the driver has at least two driver fingers arranged at equal distances from the driver axis and the indexing disk slots are equipped at their free ends with arc-shaped curves widening the slot width outwardly in such a manner that angle of rotation regions, in which the driver secures the indexing disk against any rotation, adjoin an angle of rotation region of the driver, over which this turns the indexing disk.

24 Claims, 5 Drawing Sheets

TOOL TURRET FOR MACHINE TOOLS

This application is a continuation of U.S. Ser. No. 08/653,869 filed May 28, 1996, abandoned, which is a continuation of International Application No. PCT/EP94/02912, filed Sep. 2, 1994.

The invention relates to a tool turret device for machine tools, in particular machine lathes, comprising a turret head bearing device, to which a turret head having a plurality of tool stations is attached for rotation about an indexing axis, a turret head indexing device for rotating the turret head out of one indexing position, in which one of its tool stations is in an operating position, into a different indexing position, in which a different tool station is in an operating position, as well as locking means for holding the turret head in its indexing positions and for the rotary release of the turret head during indexing, wherein the turret head indexing device has an indexing disk similar to a Maltese cross, which is rotatable about the indexing axis together with the turret head, is non-rotatably connected to the turret head and has for each tool station of the turret head a slot (where required in the form of a groove or the like) open at its circumference (where required at the circumference of an operative region of the indexing disk) and provided with two longitudinal flanks, and a driver which is rotatable about a drive axis parallel to the indexing axis and bears eccentrically to the drive axis a driver finger (where required rod or the like) for insertion into an indexing disk slot, for indexing the indexing disk further and for removal from the indexing disk slot.

The purpose of a tool turret is to bring a plurality of tools, which are held in the tool stations of the turret head, quickly and precisely into an operating position one after the other in a machine tool. Since, in general, workpieces cannot be machined while the turret head is being indexed further (in order to bring a different tool into an operating position), unproductive idle times of this type have the effect, however, of increasing costs with respect to the workpieces to be produced, it is required of the producers of machine tools to shorten these idle times more and more.

In known tool turret devices, one has to differentiate between two functions which are independent of one another with respect to their performance: On the one hand, the locking or unlocking of the turret head in defined indexing positions, in each of which a tool of the turret head is normally located in the operating position, the locking of the turret head serving the purpose of preventing any undesired turning of the turret head, and, on the other hand, the rotating or indexing of the turret head into the next or one of the other indexing positions in order to bring a different tool into the operating position.

In order to lock or unlock the turret head, index bolts and the like insertable into corresponding bores have been used; these do, however, have the disadvantage that they cannot lock the turret head free of clearance on account of the required clearance of motion; moreover, they necessitate complicated mechanical actuating mechanisms which are subject to considerable wear and tear and normally allow only one direction of rotation of the turret head. Other known locking devices work with so-called HIRTH-type tooth systems (rings with toothed surfaces which engage in one another with their teeth in the locked state); HIRTH-type tooth systems comprising two toothed rings, of which one is stationary and the other connected to the turret head, necessitate an axial displacement of the turret head for locking or unlocking which makes them unsuitable for quick turret indexings on account of the considerable mass of a turret head equipped with tools. Three-part HIRTH-type tooth systems comprising three toothed rings, of which one is displaceable in the direction of the turret head indexing axis in order to be able to bring it into engagement with a toothed ring provided on the turret head and, at the same time, with a stationary toothed ring, are expensive to produce and assemble since the precision of the locking of the turret head in its indexing positions is dependent on the exactness of the tooth engagement. Moreover, both types of HIRTH-type tooth systems make actuating devices for an axial displacement of the turret head or one of the three toothed rings necessary.

For the turning, i.e. the indexing of the turret head, electrical or hydraulic positioning drives are used in known tool turret devices. These drives must be highly dynamic when a fast indexing and an exact positioning of the turret head are required and they are, therefore, expensive; furthermore, it is known to turn, i.e. index, the turret head by means of a Maltese cross transmission. In both cases, one of the devices explained in the above for locking or unlocking the turret head is, however, added in the known tool turret devices since the known, specified rotary drives are not able to hold the turret head exactly in its indexing positions—in this connection, the high forces and torques, which can occur when work is carried out at the turret head with a tool borne by the turret head, should not be left out of consideration.

The object underlying the invention is to create a tool turret device which may be produced inexpensively but at the same time makes short idle times possible, i.e. short times for the unlocking, indexing and locking of the turret head.

Proceeding from a known tool turret device of the type mentioned at the outset, this object may be accomplished in accordance with the invention in that the driver is provided with at least two driver fingers which are arranged at equal radial distances from the driver drive axis and at an angle of rotation distance from one another, and that a curve of the indexing disk convex towards a longitudinal center line of the relevant slot is associated with each longitudinal flank of each of the indexing disk slots for resting against a driver finger, wherein the slots, the curves and the driver fingers are designed and arranged in such a manner that, proceeding from a rest position of the driver, in which one of the turret head tool stations is in an operating position and the two driver fingers rest free of clearance against the two adjacent curves of two adjacent indexing disk slots, a first one of the two driver fingers can be inserted into a first one of these two indexing disk slots due to rotation of the driver, the turret head is thereby and due to further rotation of the driver rotatable into its next indexing position and, in the latter, this first driver finger as well as another driver finger rest free of clearance against one of the two aforementioned curves as well as against the curve of the next indexing disk slot adjacent this one curve.

The inventive construction is therefore characterized in that on both sides of that angle of rotation region of the driver, over which the latter turns the indexing disk, driver positions are located, in which the indexing disk is locked, i.e. secured against rotation, by two driver fingers and held exactly in an indexing position which corresponds to an operating position of the turret head. In this respect, the indexing disk slots and the curves associated with them must, of course, be dimensioned such that one of the two driver fingers releases the indexing disk when the other driver finger begins to turn the indexing disk.

It has already been pointed out that the slots of the indexing disk can also have the shape of grooves but also the shape of other detent-like channels of the indexing disk, between which the driver fingers can engage and with which the latter can interact. The slots or the like need also not necessarily be straight or even extend radially to the indexing axis although this is recommended. The driver fingers also need not be elongated elements which are held by the driver only at their one end—the driver could, for example, have the shape of two disks which are arranged in axial spaced relation to one another and between which the driver fingers extend in the form of rods so that the latter interact with the indexing disk with central regions. It is clear, particularly from the example, in which the driver fingers engage in grooves of the indexing disk, that these grooves need not extend as far as the outer circumference of the indexing disk (the latter considered in a front view) and that a drum-shaped element can also replace an indexing disk.

A tool turret device designed according to the invention has, in principle, the following advantages: The turret head indexing device forms at the same time the means for the precise locking of the turret head in its indexing positions and for the unlocking of the turret head so that not only can special locking means be omitted but also an additional actuating device for these locking means. A further, essential advantage consists in the fact that the transitions between unlocking, turning and locking of the turret head can take place completely harmonically and without any delay in time which contributes to achieving quicker turret indexing procedures in the same way as the fact that unproductive idle times, as are necessary in the state of the art for the unlocking and locking of the turret head and the signal transmission between machine tool and machine tool control connected with it, can be avoided. When comparing the inventive construction with the state of the art the fact should also not be left out of consideration that in the known constructions, if short turret indexing times are required, the angle of rotation positioning of the turret head effected by the turret head indexing drive can never be exact, particularly not in the case where the turret head has a considerable imbalance due to corresponding tool equipment, and so the turret head will not be turned or returned finally into the selected indexing position until it is locked, e.g. by a HIRTH-type tooth system.

The invention therefore results not only in a considerable simplification of the construction of a tool turret device and, therefore, in considerable cost savings, but also in a clear reduction of the time intervals necessary altogether for indexing the turret head further.

The indexing disk slots could extend as far as the indexing disk circumference with a constant width if the circumference is not intended to be circular in design and, consequently, the curves can form regions which project in radial direction beyond the outer ends of the indexing disk slots. However, embodiments are preferred, in which each of the indexing disk slots widens towards the outside in the region of its open end in order to thus create the possibility of giving the indexing disk a circular shape without the indexing disk slots making any turning of the driver out of one of its rest positions impossible.

For a clearance-free locking of the turret head in its indexing positions it is merely necessary for two driver fingers to rest free of clearance against two of the curves of the indexing disk in the rest positions of the driver corresponding to the indexing positions of the turret head; this may be achieved, for example, with curves which correspond to part of an ellipse or a parabola and thus ensure that the locking of the indexing disk and, with it, the turret head takes place jerk-free when the driver is turned into one of its rest positions. So that no complicated control for the angle of rotation positions is required for the driver or rather its rotary drive, the curves are, however, of an arc-shaped design in preferred embodiments of the invention, at least over their effective regions, namely such that the arcs of the two facing curves of two adjacent indexing disk slots extend concentrically to the driver drive axis when the turret head and, with it, the indexing disk takes up one of its or rather their indexing positions. Such an embodiment of the inventive tool turret device is therefore characterized by the fact that the curves are of an arc-shaped design and of such a length and arranged such that, proceeding from one of the rest positions of the driver, the two driver fingers move along these two curves and so as to rest against them over a first angle of rotation region of the driver without turning the indexing disk, the turret head is turned into its next indexing position by the first driver finger engaging in the first indexing disk slot over a second angle of rotation region of the driver following the first angle of rotation region, and the first and another driver finger move along one of these two curves as well as a curve of the next indexing disk slot adjacent to the latter curve and so as to rest against these curves over a third angle of rotation region of the driver following the second angle of rotation region without turning the indexing disk so that the turret head is secured against rotation by the curves and the driver fingers in the first and the third angle of rotation regions. The special features of such a construction are, therefore, that angle of rotation regions of the driver, in which, on the one hand, a rotary movement of the driver does not result in a rotary movement of the indexing disk and, on the other hand, the latter is locked, i.e. secured against rotation, by the driver fingers and is thus held precisely in an indexing position together with the turret head, adjoin that angle of rotation region of the driver, over which the latter turns the indexing disk and, with it, the turret head, on both sides. For a precise positioning of the turret head in its indexing positions it is not, then, important whether the rotary drive for the driver is able to stop this exactly in predetermined angle of rotation positions since the driver can be stopped anywhere in the third angle of rotation region after passing through the second angle of rotation region since the driver locks the indexing disk and, with it, the turret head precisely in one of the indexing positions in any angle of rotation position located within this third angle of rotation region. The motor effecting the rotary drive of the driver does not, therefore, require any complicated position control since any electrical geared motor with a brake or hydromotor is able to stop the driver within the third angle of rotation region.

In a preferred embodiment of the inventive tool turret device, the driver has only two driver fingers. As is clearly apparent when viewing the attached illustrations of a particularly advantageous embodiment of the inventive tool turret device, a construction, in which the driver has only two driver fingere, does represent the simplest realization of the invention but embodiments are, however, conceivable, in which the driver has more than two, e.g. three, driver fingers—depending on the number of the tool stations and, therefore, of the indexing positions of the turret head, the configuration of the indexing disk slots, the position of the driver drive axis relative to the indexing axis and the size of the radial distance of the driver fingers from the driver drive axis and the angle of rotation distance of the driver fingers from one another, the number of driver fingers can vary.

The specified curves can be worked directly onto the indexing disk, in particular by milling. For reasons of manufacture it can, however, also be advantageous when the curves are formed by separate parts secured to the indexing disk since these parts can be easily and inexpensively manufactured very precisely; on the other hand, separate parts of this type require special measures in order to be able to secure them on the indexing disk in an exactly positioned manner.

As already mentioned, the driver fingers could be simple rods, pins and the like but an indexing device which runs more easily and quietly with low wear and tear and a more precise cycle of movement results when the driver fingers are formed by rollers mounted on the driver so as to be freely rotatable.

To avoid jerks and vibrations occurring when the turret head is indexed further, embodiments are preferred, in which the width of the regions of the slots effective for further indexing corresponds to the diameter of the driver fingers so that the latter run in the slots without transverse clearance.

To achieve an impact-free and harmonic cycle of movement of the indexing device, it is recommended that the construction be designed such that—for the driver fingers and seen in the direction of the indexing axis—the curves merge continuously into the functional regions of the longitudinal flanks of the indexing disk slots, with it being particularly advantageous when—again with respect to a driver finger—the longitudinal flanks of the indexing disk slots form tangents to the radially inner curve ends.

It is completely adequate per se when the turret head can be positioned and precisely locked in its various indexing positions by the inventive indexing device; with a view to the fact that during use of tools borne by the turret head quite considerable machining forces can act on the turret head, the stability of the inventive tool turret device can, however, be increased even further when one of the parts rotatable about the indexing axis, namely, and in particular, the turret head, can be pressed preferably by a piston acted upon in a controlled manner by pressure medium against a stationary part of the turret head bearing device, in particular against a housing of this bearing device, namely when the turret head has reached its desired indexing position. The stroke of this pressure medium piston can be minimal and so hardly any pressure medium, such as, for example, hydraulic oil, need flow for blocking and releasing the turret head and, consequently, only very little time is required for these procedures. This principle can be realized in a particularly simple manner when the pressure medium piston is acted upon with pressure medium only on one side (in the sense of pressing the rotatable part against the stationary part) and at least one seal associated with the pressure medium piston forms a return spring for the pressure medium piston which is operative during pressure release since, in this case, a controlled supply of pressure medium to the other side of the piston can be dispensed with as well as a separate return spring for the pressure medium piston.

The manner in which the piston is acted upon with pressure medium can also be controlled in a simple way when a cam is provided which is non-rotatably coupled with the driver and controls a pressure medium valve in a pressure medium line leading to the pressure medium piston.

As already mentioned, it is not of importance in preferred embodiments of the inventive indexing device for the driver to be stopped within the first or third angle of rotation region in a specific angle of rotation position; this circumstance makes it possible to avoid unproductive idle times for the blocking or releasing of the turret head with the aid of the specified pressure medium piston, namely in that the specified cam is designed such that the pressure medium valve is reversed in the beginning and end sections of the first or third angle of rotation region in order to thus block the turret head over the remaining sections of the first and third angle of rotation regions.

Additional, advantageous developments of the inventive tool turret device result from the attached claims and/or from the following description and the attached drawings of two particularly advantageous embodiments; in the drawings:

Figure 1:
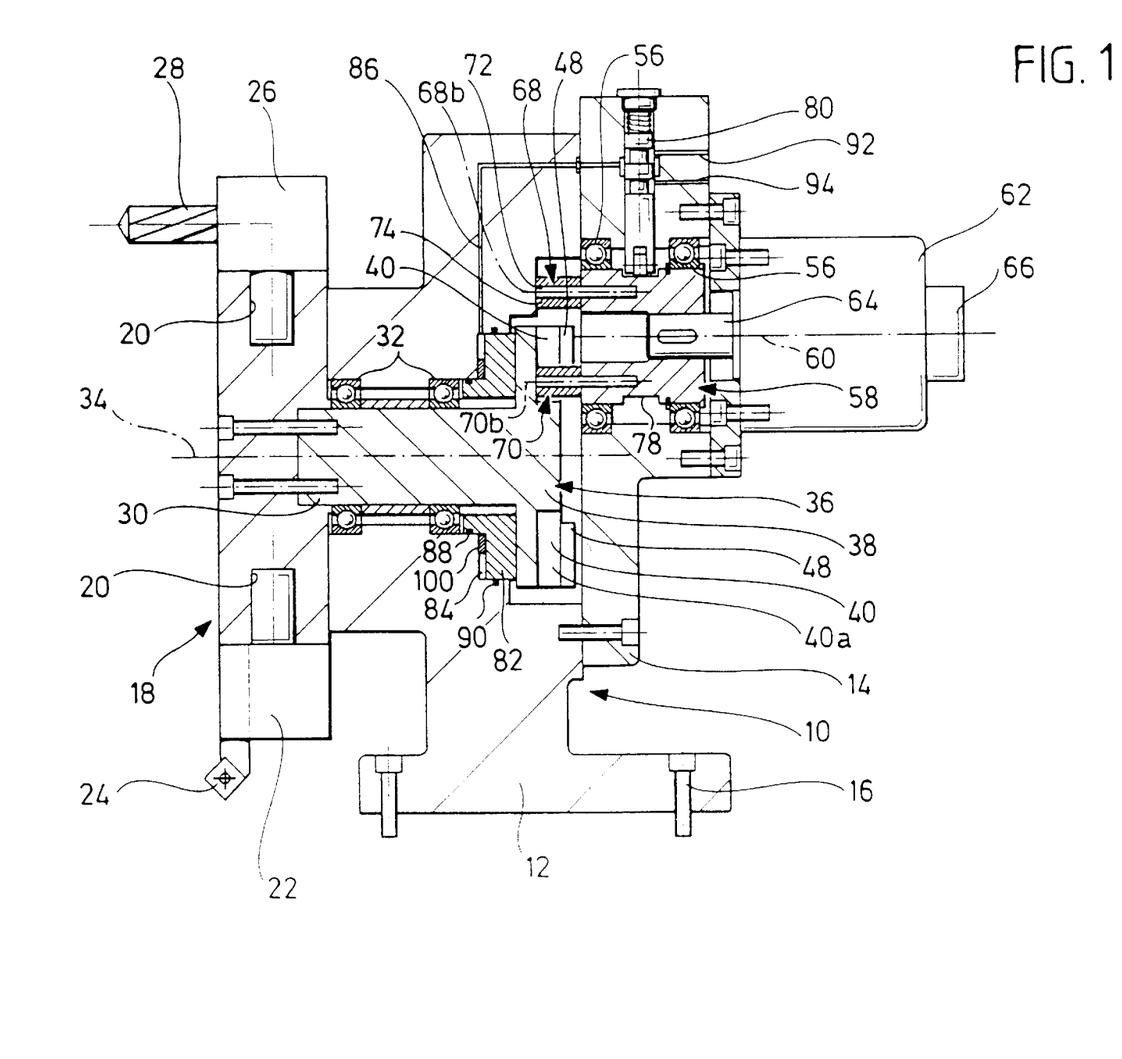
FIG. 1 is a longitudinal section through the first embodiment of the inventive tool turret device, the turret head of which has, for example, eight tool stations and, therefore, eight indexing positions, FIG. 1 showing the tool turret device in a state it reaches after half of the procedure of indexing the turret head further from one of its indexing positions into the next indexing position has taken place.

FIG. 1 shows a tool turret bearing device in the form of a housing 10 with a housing body 12 and a housing cover 14, whereby this housing can be attached by means of screws 16, for example, to a tool carrier slide of a machine tool which is not illustrated. The illustrated, inventive tool turret device includes, in addition, a turret head 18 which is provided at its circumference with eight tool stations 20 arranged at equal distances, each of which can be equipped with an interchangeable tool holder. FIG. 1 shows two of these tool stations, one of which is equipped with a tool holder 22 bearing a turning tool 24 and the other with a tool holder 26 bearing a drill 28 (since tool turrets for rotarily drivable tools are known, the tool holder 26 and the tool station 20 accommodating it could also be designed such that the drill 28 can be used as a driven tool). The turret head 18 is secured to the one end of a turret indexing shaft 30 which is mounted for rotation in the housing body 12 by means of bearings 32 so that the indexing shaft 30 and, with it, the turret head 18 can be turned about an indexing axis 34. The other, right-hand end of the indexing shaft 30 according to FIG. 1 bears an indexing disk 36, the construction and configuration of which will be explained in greater detail on the basis of FIG. 2.

Figure 2:
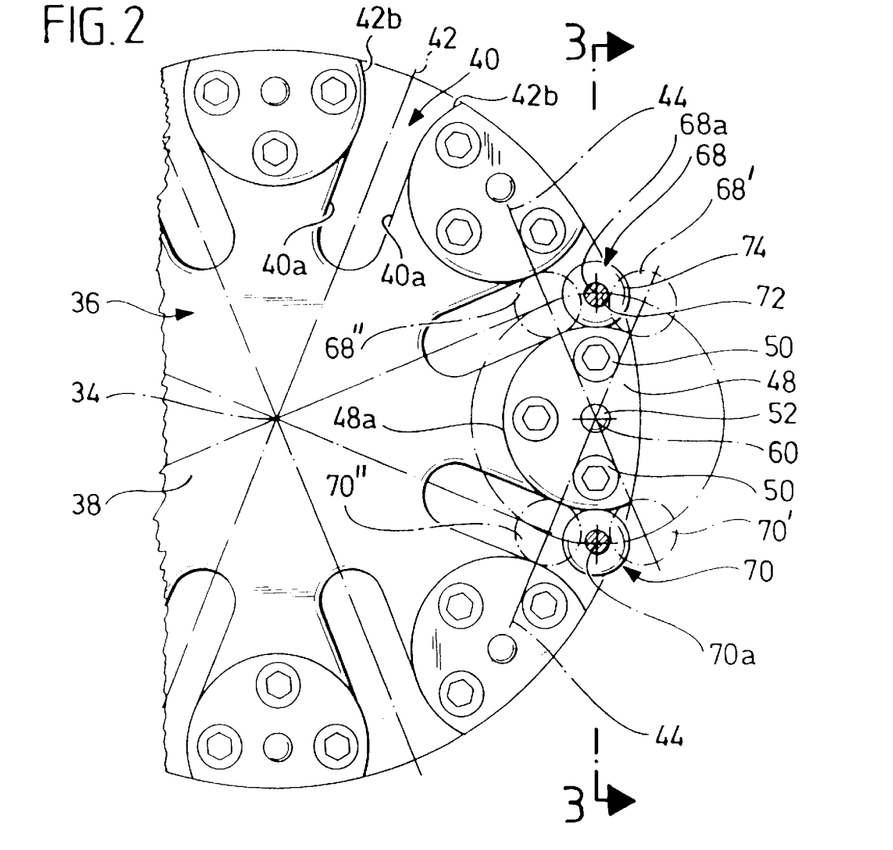
FIG. 2 shows the greatest part of the indexing disk as well as the driver of the first embodiment equipped with two driver fingers, seen in the direction of the indexing axis, FIG. 2 showing the state, in which the indexing disk takes up an angle of rotation position corresponding to an indexing position of the turret head (additional positions of the driver fingers which these can take up without the indexing disk being turned are indicated by dash-dot lines)

The indexing disk 36 has a circular disk body 38 concentric to the indexing axis 34 and having a number of slots 40 corresponding to the number of tool stations 20 of the turret head 18. These slots 40 are arranged at equal angle of rotation distances from one another and have, in the illustrated embodiment, the shape of grooves which are worked into the disk body 38 from the one end face thereof. In accordance with the invention, each of the slots 40 is designed to be in mirror symmetry to a central plane 42 which includes the indexing axis 34 and represents a diameter plane of the disk body 38. In accordance with an additional feature of the invention, each of the slots 40 comprises two regions, namely an inner, first region located in radial direction inside a line 44 extending at right angles to the associated central plane 42 and an outer, second region located outside the line 44, and, if a rounding which is provided at the radially inner slot end and has no function is disregarded, the side walls 40a of the inner slot region extend parallel to one another whereas the side walls of the outer slot region are defined by curves 42b, the configuration of which will be explained in greater detail at a later stage.

Figure 3:
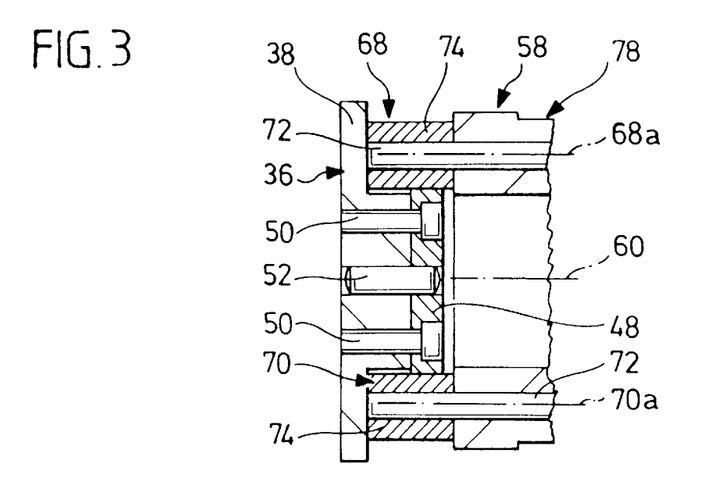
FIG. 3 is a section according to line 3—3 in FIG. 2.

A positioning disk 48 is secured on the disk body 38 between respective adjacent slots 40, namely by means of screws 50 (cf. in particular, FIG. 3), and in accordance with the invention each of these positioning disks has the shape of a section of a flat circular-cylindrical body with a circular-cylindrical peripheral surface 48a. As shown in FIGS. 2 and 3, the curves 42b are formed by parts of these peripheral surfaces 48a and project (in a front view of the indexing disk 36) outside the line 44 somewhat beyond the actual side walls 40a of the slots 40 worked into the disk body 38, namely in the direction towards the central plane 42 belonging to the relevant slot, as FIG. 3 clearly shows. Since the exact position of the positioning disks 48 on the disk body 38 is of decisive importance for the exactness of the positioning of the turret head in its various indexing positions, a set pin 52, which engages in bores in the positioning disk and the disk body 38, is provided for each positioning disk.

The additional construction of the tool turret device will now be described in the following on the basis of FIG. 1.

A driver 58 serving to turn the indexing disk 36 is mounted in the housing cover 14 by means of two bearings 56 so as to be rotatable about a driver drive axis 60; this driver can be driven by a motor 62 attached to the housing cover 14 and is for this purpose non-rotatably connected to a motor shaft 64.

A switching device 66 is seated on the motor 62 for switching the motor 62 on and off. This is preferably an electrical switching device which is able to stop the motor shaft 64 at least approximately in desired angular positions.

As shown particularly clearly by FIGS. 2 and 3, the driver 58 is provided on its end face facing the indexing disk 36 with two driver fingers 68 and 70, each of which consists of a hinge pin 72 secured in the driver 58 and a cylindrical roller 74 freely rotatable on this pin. In the illustrated embodiment, the axes 68a and 70a of the two driver fingers 68 and 70 which are arranged at equal distances from the drive axis 60 are located opposite one another in relation to the drive axis 60, i.e. in a diameter plane of the driver 58, so that the angle of rotation distance between the two driver fingers is 180°.

In accordance with the invention, the center of the circular-cylindrical peripheral surface 48a of that positioning disk 48, which is associated with the tool station 20 of the turret head 18 located in an operating position, is located on the driver drive axis 60 in each indexing position of the turret head 13 (cf. FIG. 2).

According to a further feature of the invention, the distance of the axes 68a and 70a of the driver fingers 68 and 70 from the driver drive axis 60 is coordinated with the diameter of the driver fingers, i.e. the diameter of the rollers 74, and the distance between the facing curves 42b of two adjacent slots 40, in the illustrated preferred embodiment, therefore, with the diameter of the circular-cylindrical peripheral surface 48a of the positioning disks 48, such that the driver fingers rest against these curves 42b free of clearance; in the illustrated preferred embodiment the rollers 74 therefore run along the curves 42b free of clearance.

Furthermore, it is advantageous when the width of the slots 40 inside the line 44, i.e. the distance of the side walls 40a from one another, is equal to the diameter of the driver fingers, in the particular case of the rollers 74, or is only slightly larger than this diameter.

In accordance with a further feature of the invention, a cam 78 is formed on the circumference of the driver 58 (cf. FIGS. 3 and 4) and this serves to control a valve 80 which is accommodated in the housing cover 14 and the function of which will be explained at a later stage.

As is apparent from FIG. 1, the rearward end face of the turret head 18 is located directly opposite a front end face of the housing body 12. Furthermore, the housing body 12 accommodates a ring-shaped pressure medium piston 82 comprising the indexing shaft 30 and forms for this piston with a stepped bore a pressure medium chamber 84, into which a pressure medium channel 86 coming from the valve 80 opens. In accordance with the invention, the pressure medium piston 82 is located directly opposite the indexing disk 36, in the illustrated embodiment the end face of the disk body 38 facing away from the positioning disks 48, and the pressure medium chamber 84 is located on the side of the pressure medium piston 82 facing away from the indexing disk 36. In accordance with the invention, two sealing rings 88 and 90 held by the pressure medium piston 82 and/or by the housing body 12 serve to seal the pressure medium chamber 84. These sealing rings are elastically deformable in axial direction in such a manner that they can bring about a resetting of the pressure medium piston 82 (to the left according to FIG. 1) once this has been pressed against the indexing disk 36 due to pressure acting on its left side according to FIG. 1 and, subsequently, the pressure medium chamber 84 has again been made pressureless.

In accordance with an additional feature of the invention, the turret head 18, during indexing, slides on the end face of the housing body 12 facing the turret head or in this state of the tool turret device only a very slight gap is present between turret head and housing body. In order to press the turret head 18 against the housing body 12 and thus clamp it against a stationary part, a very slight movement of the pressure medium piston 82 is therefore adequate and so, for this purpose, practically no pressure medium has to flow in the pressure medium channel 86.

Pressure medium, in particular hydraulic oil, can be supplied to the pressure medium channel 86 via the valve 80 and a pressure medium channel 92 formed in the housing cover 14 while a pressure medium channel 94 serves to relieve pressure in the pressure medium chamber 84.

Reference should also be made to the fact that a customary axial clearance of the bearings 32 holding the indexing shaft 30 is completely adequate to clamp the turret head 18 on the housing body 12 with the aid of the pressure medium piston 82.

The driver fingers 68, 70 of the illustrated embodiment are, of course, designed to be of such a length that they can interact not only with the positioning disks 48 but also with the side walls 40a of the slots 40 formed in the disk body 38.

Finally, FIG. 1 shows an intermediate ring 100, due to which it can be ensured, despite the formation of the pressure medium chamber 84, that the pressure medium piston 82 carries out only a very minimal stroke, the size of which can be determined by adjustment of the intermediate ring 100, for clamping the turret head 18 in position.

The functioning of the inventive turret head indexing device and the cycle of movement during the further indexing of the turret head will now be described in the following in greater detail on the basis, in particular, of FIGS. 2 and 4. In this respect, this description is based on the illustrated embodiment with eight tool stations of the turret head; the alterations in dimensions applicable for a different number of tool stations will, however, result for the person skilled in the art automatically.

Figure 4:
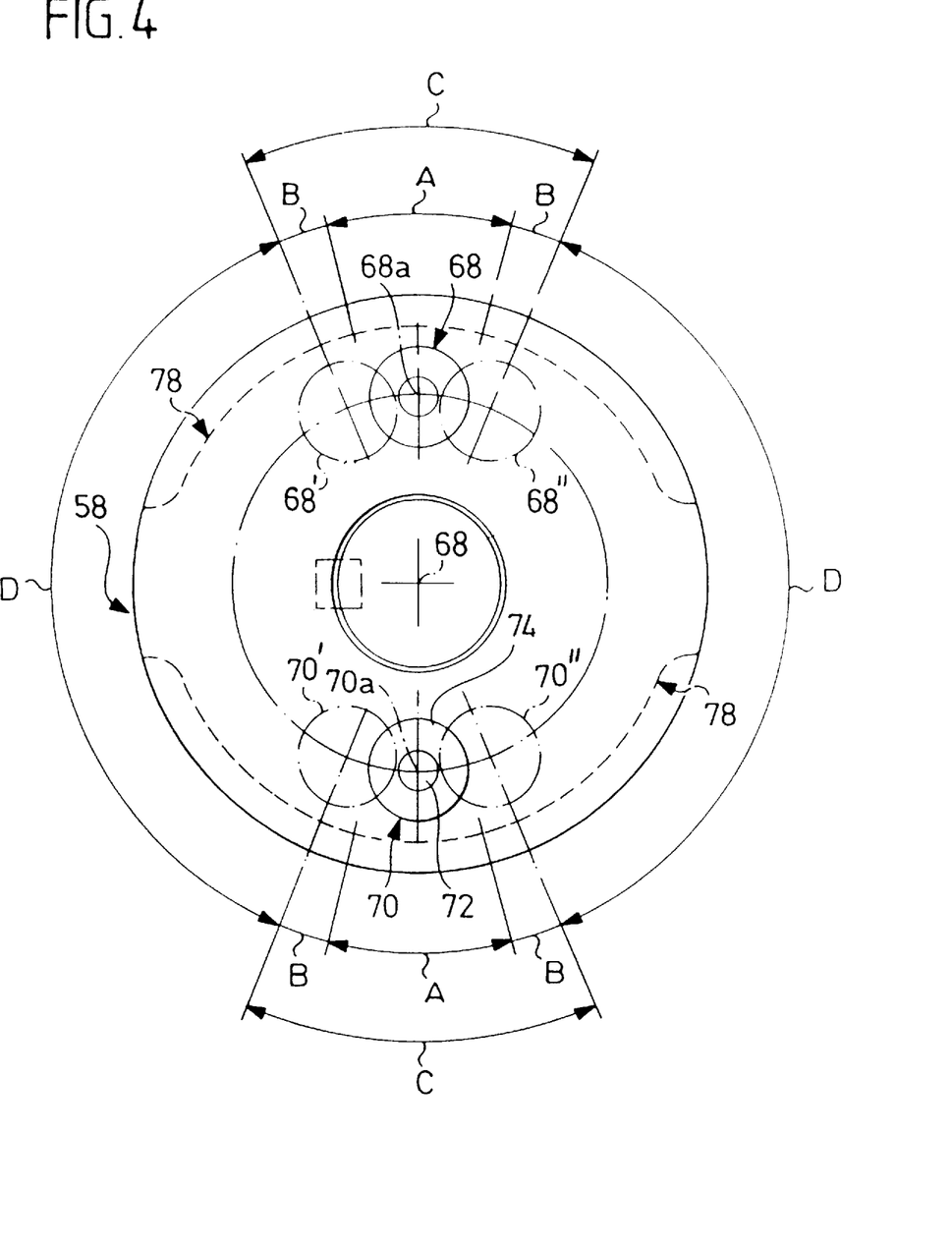
FIG. 4 is a front view of the driver of the first embodiment, wherein to explain the operating cycle the three aforementioned angle of rotation regions of the driver have been illustrated in the case of eight tool stations of the turret head and, moreover, the cam which serves to control the securing of the turret head has been indicated.

The various positions of the driver fingers 68 and 70 illustrated by solid and dash-dot lines have been designated in FIGS. 2 and 4 by corresponding reference numerals, namely 68', 68, 68" or 70', 70, 70". Moreover, several angle of rotation regions of the driver 58 have been indicated in FIG. 4 with A, B, C and D; with the illustrated preferred embodiment with eight stations the angle of rotation region C is 45° and the angle of rotation region D 135°, the sum of C and D is, therefore, 180°; moreover, the sum (A+2B) is 45°. In a turret head with only 6 equidistant tool stations, the angle of rotation region D would preferably be 120°.

It is now to be assumed that during a preceding indexing procedure the motor 62 has stopped the driver 58 in that angle of rotation position, in which its driver fingers 68 and 70 take up the angle of rotation positions illustrated in FIGS. 2 and 4 by solid lines.

Half a revolution of the driver 58, i.e. a rotation through approximately 180°, leads to the turret head 18 being rotated further from one indexing position into one of the two indexing positions adjacent to this indexing position—the turret head may be turned by the inventive indexing device in both directions of rotation since the indexing device is, in this respect, designed to be completely symmetrical. Within the angle of rotation region C, i.e. between the positions 68' and 68" or 70' and 70", the driver fingers 68, 70 move along the curves 42b without turning the indexing disk 36 and, with it, the turret head 18; on the contrary, the latter is locked in its respective indexing position over the entire angle of rotation region C. If it is assumed that the driver 58 is turned in the counterclockwise direction according to FIGS. 2 and 4, the driver finger 68 lifts away from the positioning disk 48 at the beginning of the angle of rotation region D and runs along the side wall 40a of the respective slot 40 adjoining the positioning disk circumference; since the driver finger 70 runs out of the slot 40 associated with it and clears the adjacent curve 42b when the driver finger 68 leaves the positioning disk 48, the rotation of the indexing disk 36 and, with it, of the turret head 18 can begin at this moment. Whilst the driver is passing through the angle of rotation region D, the turret head 18 is turned further through the angular distance between two adjacent tool stations, with eight tool stations through 45°. At the end of the angle of rotation region D, i.e. when an angle of rotation region C again begins, the driver finger 68 passes from one of the side walls 40a onto the peripheral surface 48a of the next positioning disk 48, and, at the same time, the driver finger 70 enters the next-but-one slot 40 and likewise contacts the next positioning disk 48. Since the rotary movement of the turret head 18 is terminated after passing through the angle of rotation region D, it is unimportant whether the driver 58 is turned exactly through 180° from one indexing position into a next indexing position for the purpose of indexing the turret head since it is only important, as will be shown in the following, for the driver 58 to be stopped within the angle of rotation region A so that the switching device 66 controlling the starting and stopping of the motor 62 need not be equipped for an exact switching with respect to the angle of rotation.

The cam 78 controlling the valve 80 and, with it, the clamping of the turret head 18 is designed in accordance with the invention such that the valve 80 is reversed at the ends of the angle of rotation region A, namely such that at the beginning of the procedure of indexing the turret head further while the driver 58 is passing through the angle of rotation region B the pressure medium chamber 84 acted upon with pressure oil over the angle of rotation region A is made pressureless whereas, after the turret head has been turned, namely after the driver has passed through the angle of rotation regions D and B, the pressure medium piston 82 is again acted upon with pressure medium and the turret head 18 is clamped on the housing 10—the short time span required for passing through the angle of rotation region B is sufficient to release the clamping of the turret head 18. The turret head can thus be indexed further in both directions of rotation.

Whereas, in the illustrated first embodiment, the driver 58 must be stopped within the angle of rotation region A, the larger angle of rotation region C would be available for stopping the driver in a tool turret device of the type without clamping of the turret head.

It is essential that the one driver finger releases one of the curves 42b (because the latter then ends) when the other driver finger has reached an angle of rotation position, in which it begins to turn the indexing disk 36.

The parts of the second embodiment illustrated in FIGS. 5 and 6 will be essentially described in the following only insofar as the second embodiment differs from the first embodiment, and in FIGS. 5 and 6 the same reference numbers as in FIGS. 1–3 have been used for those parts of the second embodiment which represent equivalents of parts of the first embodiment, but with a prime sign added.

In the second embodiment, an indexing disk 36' is again provided on the turret indexing shaft 30' mounted in a housing body 12' for rotation about an indexing axis 34'. This indexing disk 36' has for each indexing position of the turret head an indexing disk slot 40' which is open at its edge and designed as a groove, the functional region of which is formed by two longitudinal flanks 40a' parallel to one another and which widens towards the outside in its radially outer region. At the right-hand end face of the indexing disk 36' according to FIG. 5, positioning members 48' have been formed by milling. The number of these positioning members corresponds to the number of slots 40', each is located with respect to the angle of rotation centrally between two slots 40' and each forms two curves 42b', the two curves 42b' of each positioning member 48' forming parts of the cylindrical outer surface of a circular cylinder, the axis 60" which extends parallel to the indexing axis 34' and is located with respect to the angle of rotation exactly in the center between the central planes 42' of the two adjacent slots 40'.

A driver 58' which is mounted for rotation about a driver drive axis 60' and can be rotarily driven by means of a toothed drive means 62' is again provided with two driver fingers 68' and 70' offset in relation to one another through 180° with respect to the angle of rotation. Each of these driver fingers has a hinge pin 72' which is secured in the driver 58' and on which a roller 74' designed as a stepped cylinder is mounted for rotation. This roller forms a locking roller segment 74b' and an indexing roller segment 74a', the diameter of which is smaller than that of the locking roller segment 74b'. As is apparent, in particular, from FIG. 6, the indexing roller segments 74a' interact with the longitudinal flanks 40a' of the slots 40', the locking roller segments 74b' with the curves 42b' of the positioning members 48'.

Figure 6:
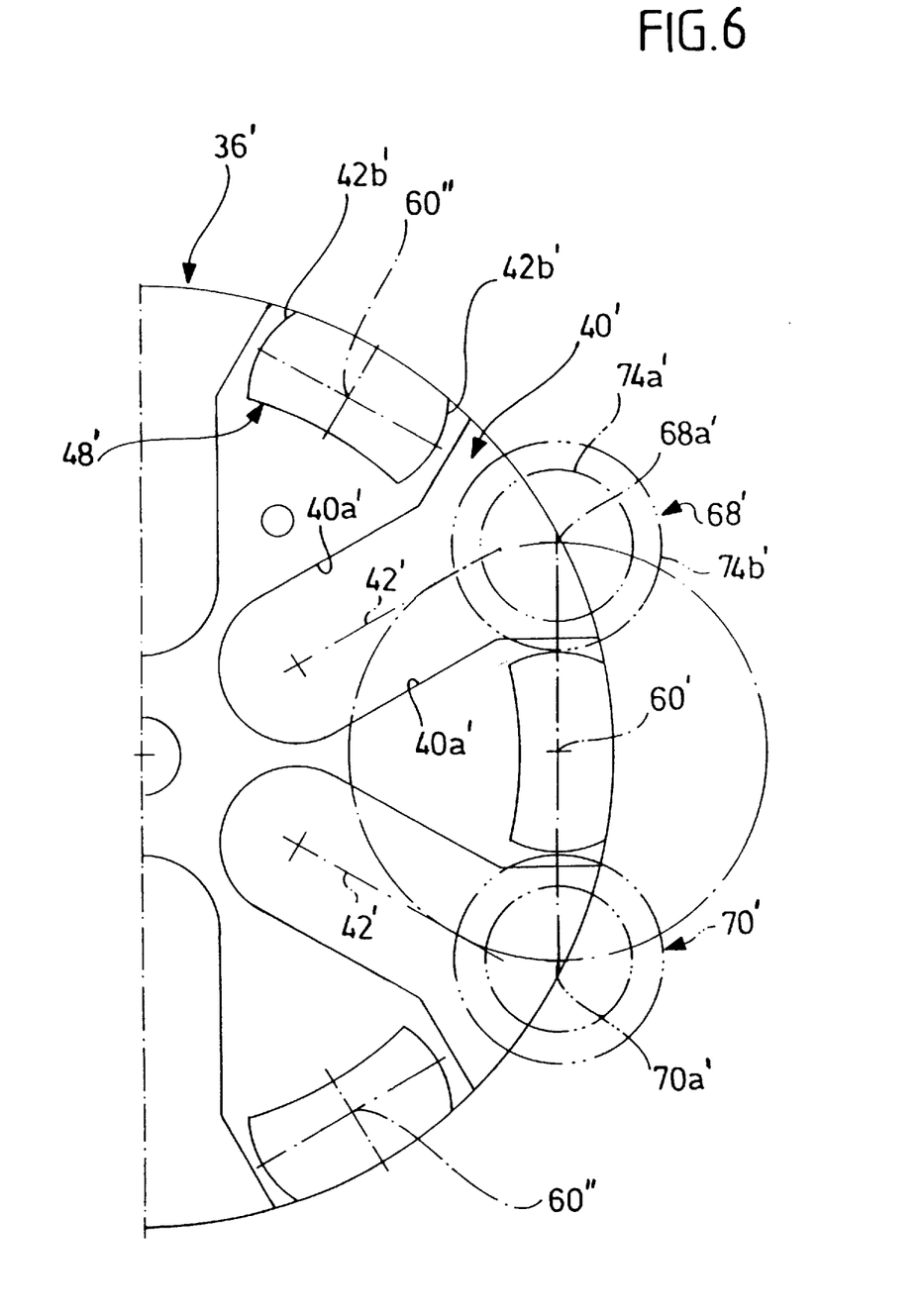
FIG. 6 is an illustration of the second embodiment corresponding to FIG. 2.

As is likewise apparent from FIG. 6, the drive axis 60' of the driver 58' coincides with the axis 60" of the effective positioning member 48' when the turret head is in one of its indexing positions and the driver is in one of its two rest positions.

Figure 5:
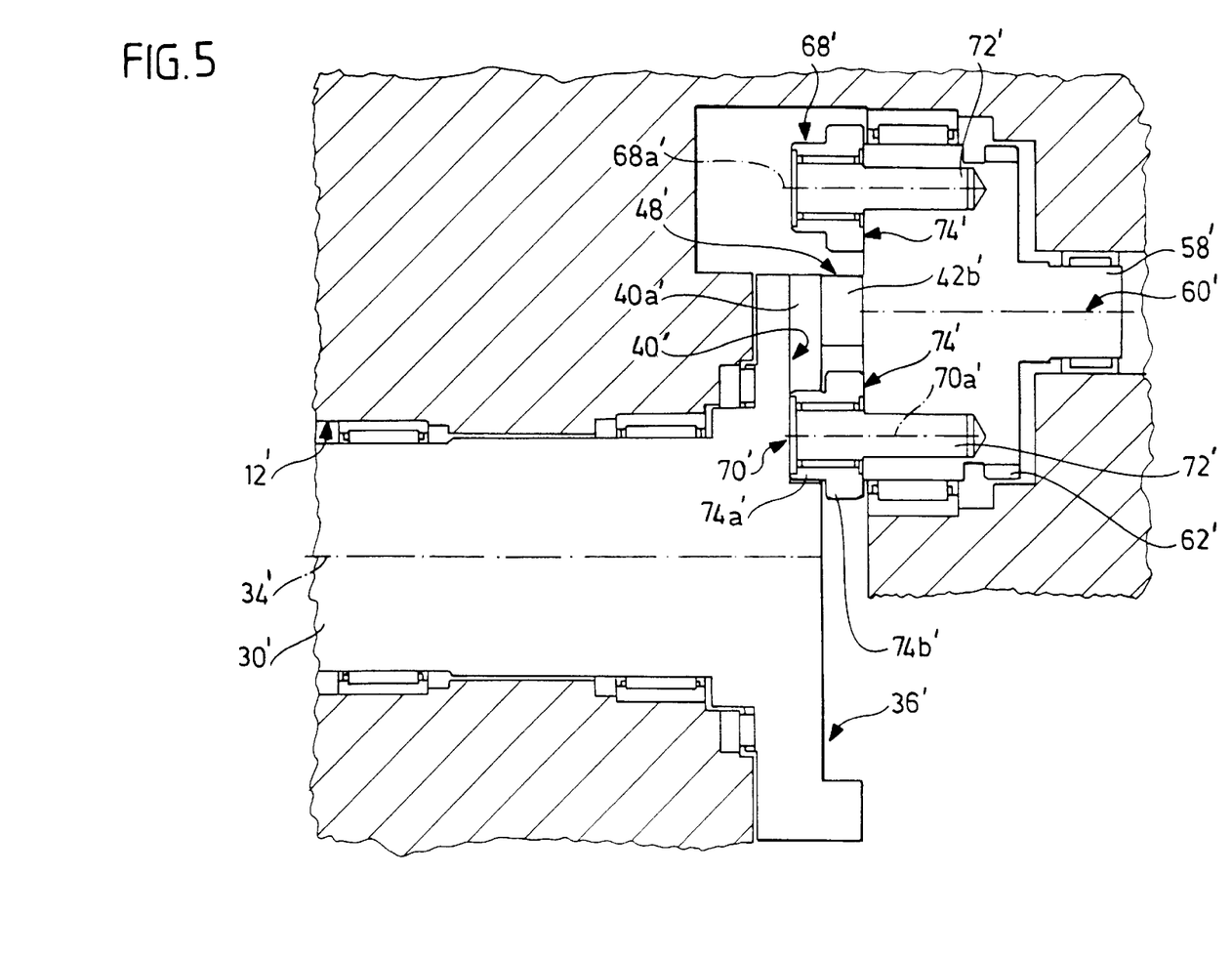
FIG. 5 shows a longitudinal section through part of the second embodiment of the inventive tool turret device, FIG. 5 corresponding to a section from FIG. 1 and containing an illustration corresponding to FIG. 3.

In the second embodiment according to FIGS. 5 and 6, the slots 40' and the curves 42b' are also designed and arranged such that when one of the two driver fingers begins to turn the indexing disk 36' the other driver finger releases the indexing disk. Moreover, the procedures of locking the indexing disk 36' and indexing the indexing disk merge harmonically and jolt-free into one another because the longitudinal flanks 40a' of the slots 40' and the curves 42b' of the positioning members 48' are of such a length and arranged relative to one another such that for the rollers 74' of the driver 58' the curves 42b' merge continuously into the longitudinal flanks 40a' and the latter form tangents to the radially inner ends of the curves 42b' (on account of the differing diameters of indexing roller segment 74a' and locking roller segment 74b' with the curves 42b' offset transversely in relation to the longitudinal flanks 40a). The second embodiment also makes it clearly apparent that the gaps between the curves effecting the locking need not be of the same size as the width of the slots effecting the indexing.

The invention is, therefore, to be seen fundamentally in the following: Tool turret device for machine tools, comprising a turret head bearing device, to which a turret head is attached for rotation about an indexing axis, a turret head indexing device as well as locking means for the turret head, the turret head indexing device having an indexing disk similar to a Maltese cross, which is rotatable together with the turret head about the indexing axis and has a slot open at its circumference for each tool station of the turret head, and a rotarily drivable driver with a driver finger for insertion into the indexing disk slots, wherein for shortening the indexing times and saving on separate locking means the driver has at least two driver fingers arranged at equal distances from the driver axis and curves are associated with the indexing disk slots in the region of their ends in such a manner that adjoining one angle of rotation region of the driver, over which this turns the indexing disk, are second angle of rotation regions, in which the driver secures the indexing disk against any rotation, namely at least over part of these second angle of rotation regions.

I claim:

1. Tool turret device for machine tools, comprising a turret head bearing device, a turret head having a plurality of tool stations being attached to said bearing device for rotation about an indexing axis, a turret head indexing device for rotating thus turret head out of one indexing position, in which one of its tool stations is in an operating position, into a different indexing position, in which a different tool station is in an operating position, as well as locking means for holding the turret head in its indexing positions and for the rotary release of the turret head during indexing, wherein the turret head indexing device has an indexing disk similar to a Maltese cross and a driver, said indexing disk being rotatable about the indexing axis together with the turret head, non-rotatably connected to the turret head and having for each tool station of the turret head a slot open at the circumference the indexing disk and provided with two longitudinal flanks, said driver being drivable for rotation about a drive axis parallel to the indexing axis and bearing eccentrically to the drive axis at least two driver fingers for insertion into an indexing disk slot for indexing the indexing disk further and for removal from the indexing disk slot, said driver fingers being arranged at equal radial distances from the driver drive axis and at an angle of rotation distance from one another, characterized in that the drive fingers are formed by rollers mounted on the driver so as to be freely rotatable about axes parallel to the driver drive axis and each driver finger has a locking roller segment with a first outer diameter as well as an indexing roller segment with a second, smaller outer diameter, the latter being smaller than the transverse distance of the two longitudinal flanks of the indexing disk slots from one another, and that a curve convex towards a longitudinal center line of the relevant slot is associated with each longitudinal flank of each of the indexing disk slots, wherein the indexing roller segments are insertable into the indexing disk slot and the locking roller segments are adapted to rest against the convex curves, said curves being set back in relation to the longitudinal flanks of the indexing disk slots and staggered in the direction of the indexing axis, and wherein the slots, the curves and the driver fingers are designed and arranged in such a manner that, proceeding from a rest position of the driver, in which one the turret head tool stations is in an operating position and the locking roller segments of two driver fingers rest free of clearance against the two adjacent curves of two adjacent indexing disk slot the indexing roller segment of a first one of these two driver fingers is insertable into a first one of these two indexing disk slots due to rotation of the driver and the turret head is thereby rotatable into its next indexing position, wherein this indexing roller segment rests only against the leading longitudinal flank of this first slot in the direction of movement of said segment, and that also in this next indexing position the locking roller segment of the first driver finger as well as the locking roller segment of another driver finger rest free of clearance against one of the two aforementioned curves and against the curve of the next indexing disk slot adjacent this curve.

2. Device as defined in claim 1, characterized in that each of the indexing disk slots widens towards the outside in the region of its open end.

3. Device as defined in claim 1, characterized in that the curves are designed such that the driver fingers are out of contact with the curves during the rotation of the turret head.

4. Device as defined in claim 1, characterized in that the curves are of a circular an arc-shaped design and of such a length and arranged such that, proceeding from one of the rest positions of the driver, the two driver fingers move along these two curves and so as to rest against them over a first angle of rotation region of the driver without turning the indexing disk, the turret head is turned into its next indexing position by the first driver finger engaging in the first indexing disk slot over a second angle of rotation region of the driver following said first angle of rotation region, and the first and another driver finger move along one of these two curves as well as a curve of the next indexing disk slot adjacent to said one curve and so as to rest against these curves over a third angle of rotation region of the driver following said second angle of rotation region without turning the indexing disk so that the turret head is secured against rotation by the curves and the driver fingers in the first and the third angle of rotation regions.

5. Device as defined in claim 4, characterized in that the curves are of such a length that at the transition from the first to the second angle of rotation regions the driver finger moving out of one of the two indexing disk slots clears the curve adjacent to it.

6. Device as defined in claim 1, characterized in that the driver has only two driver fingers.

7. Device as defined in claim 6, characterized in that the angle of rotation distance of the driver fingers from one another is 180°.

8. Device as defined in claim 4, characterized in that the sum of the three angle of rotation regions is 180°.

9. Device as defined claim 4, characterized in that the first and the third angle of rotation regions are of the same size.

10. Device as defined in claim 8, characterized in that the second angle of rotation region is at least 90° and less than 160°.

11. Device as defined in claim 10, characterized in that the second angle of rotation region is approximately 135°.

12. Device as defined in claim 10, characterized in that the second angle of rotation region (D) is approximately 120°.

13. Device as defined in claim 1, characterized in that one of the turret head and indexing disk rotatable about the indexing axis is adapted to be pressed by a pressure medium piston against a stationary part of the turret head bearing device.

14. Device as defined in claim 13, characterized in that the rotatable part is the turret head.

15. Device as defined in claim 13, characterized that the pressure medium piston is acted upon with pressure medium only on one side in the sense of pressing the rotatable part against the stationary part and at least one seal associated with the pressure medium piston forms a return spring for the pressure medium piston operative during pressure release.

16. Device as defined in claim 13, characterized a cam non-rotatably coupled with the driver for controlling a pressure medium valve in a pressure medium line leading to the pressure medium piston.

17. Device as defined in claim 1, characterized in that in the rest position of the driver the driver drive axis extends between two adjacent slots and the two facing curves of these two slots are symmetrical to the driver drive axis.

18. Device as defined in claim 1, characterized in that the slots are designed to be oriented radially in relation to the indexing axis and each symmetrical to a central plane containing the indexing axis.

19. Device as defined in claim 4, characterized in the one of the turret head and indexing disk rotatable about the indexing axis is adapted to be pressed by a pressure medium piston against a stationary part of the turret head bearing device and in that a cam is non-rotatably coupled with the driver for controlling a pressure medium valve in a pressure medium line leading to the pressure medium piston, and the cam is designed such that the pressure medium valve is reversible in beginning and end sections of the first and third angle of rotation regions respectively, in order to thus block the rotatable turret head or indexing disk over the remaining sections of the first and third angle of rotation regions.

20. Device as defined in claim 1, characterized in that the facing curves of two adjacent indexing disk slots are formed by a disk-shaped member common to both curves, the circumference of said member having the shape of at least part of a circle.

21. Device as defined in claim 20, characterized in that the circumference of the member is of an arc-shaped design at least in two oppositely located regions.

22. Device as defined in claim 1, characterized by a driver drive motor designed as an electrical geared motor or as a hydromotor.

23. Device as defined in claim 22, characterized that a switching device controlled by the angle of rotation is associated with the driver drive motor.

24. Device as defined in claim 1, characterized in that the longitudinal flanks of the indexing disk slots extend parallel to tangents to the inner ends of the curves.

* * * * *

UNITED STATES PATENT AND TRADEMARK OFFICE
CERTIFICATE OF CORRECTION

PATENT NO. : 5,768,757
DATED : June 23, 1998
INVENTOR(S) : Helmut Friedrich Link It is certified that error appears in the above-indentified patent and that said Letters Patent is hereby corrected as shown below:

```
Col. 11, line 45;   replace "thus" with ---the---.
Col. 12, line  8;   replace "slot" with ---slots---.
         line 18;   replace "slot" with ---slots,---.
         line 37;   delete "a circular".
Col. 13, line  7;   delete "(D)".
         line 22;   after "characterized" insert ---by---.
```

Signed and Sealed this

Fifth Day of January, 1999

Attest:

Attesting Officer

Acting Commissioner of Patents and Trademarks